H. HUNT.
REVOLVING RAKE.
No. 104.  Patented Dec. 10, 1836.
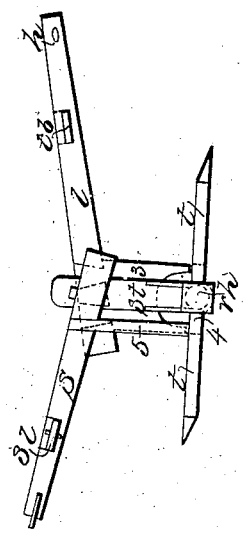
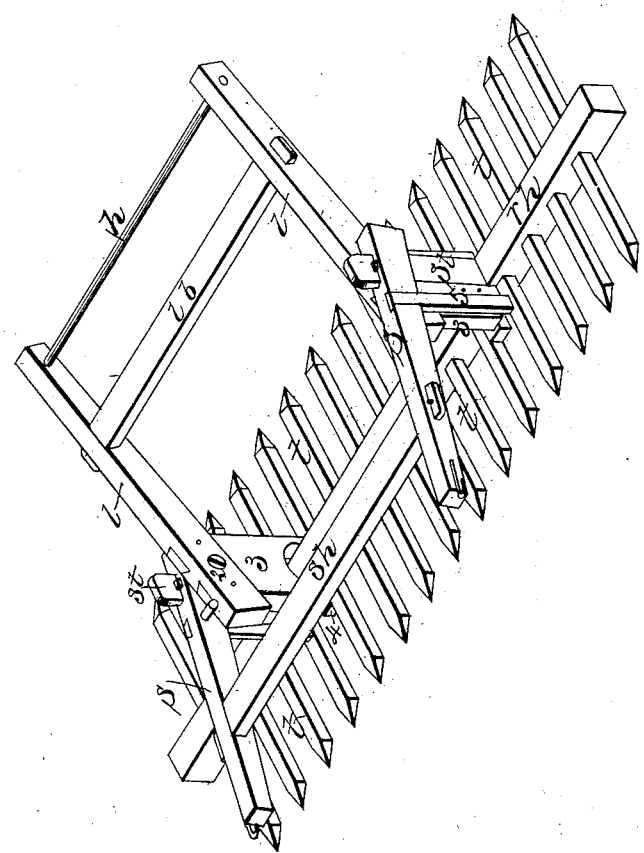

UNITED STATES PATENT OFFICE.

HIRAM HUNT, OF BRIDGEWATER, NEW YORK.

REVOLVING HORSE-RAKE.

Specification of Letters Patent No. 104, dated December 10, 1836.

*To all whom it may concern:*

Be it known that I, HIRAM HUNT, of Bridgewater, in the county of Oneida and State of New York, have invented new and useful Improvements in the Construction of Revolving Hay and Grain Horse-Rakes; and I do hereby declare that the following is a full and exact description.

The nature of my invention consists in the mode of regulating the revolving motion of the rake head using for that purpose pallets, and treadles, and other appendages, and an improved mode of regulating the pitch of the rake by the use of elastic legs attached to the shafts, and resting on two of the front teeth, and also an improved mode of attaching the levers to the machine thereby increasing the usefulness of the machine, and diminishing the expense of making it.

My improvement is best adapted to the revolving rake-head of the kind commonly known as "Moses Pennock's," and described in the schedules annexed to his first and second patents for revolving horse rakes. My plan also requires the use of shafts, shaft board, &c., nearly similar to the Pennock rake. The shafts are framed to the top of standards, and the standards are attached to the rake-head in the usual manner of attaching the shafts. The standards rise nearly perpendicular, about ten or eleven inches exclusive of the tenon on the top where the shafts are framed to them with a level joint forming an angle of about 104°. About two or three inches forward of the angle formed by the standard and shaft an elastic leg, called a shaft leg, is attached to each shaft which projects down obliquely to the nearest tooth to rest on it. The legs should be of sufficient length to elevate the forward end of the shafts about two or three inches above the line of draught so that the horse when drawing the rake will draw gently down upon the teeth. They are designed not only to keep the front teeth close to the ground, but also the shafts and standards in their proper place, with a view to enable the pallets to operate to advantage.

To regulate the revolving motion of the rake-head I use the pallets the feet of which operate on treadles inserted in the rake head. Each pallet is attached to a lever to give it motion, and is suspended on a pivot which serves for a fulcrum to the lever passing horizontally through the lever into the shaft. The lever should be connected and rendered firm by a slat, or board at a sufficient distance from the rake-head to admit its revolving and also around at their upper extremity which serves for a handle. The lower ends are attached to the shafts by the pivots above mentioned which pass through the levers about nine inches from their lower ends, and through the shafts twelve inches from the rake head and nearly over it inclining a little forward; the location of the levers should be within, or between the shafts. I make the treadles of small pieces of hard wood about nine inches long, and one inch square, and insert them in mortises in the rake head, directly under the lower ends of the levers in the same manner, and parallel with the teeth having the ends project equally distant from the front and rear sides of the rake head. The pallets are attached to the under sides of the lower ends of the levers by a level joint directly over the treadles, and under the pivots; each pallet has two legs extending down, one to each end of the treadle. The space between the legs of the pallets should be one inch less than the length of the treadles, and the distance from the interior edge of each extremity about thirteen inches from the center of the pivots on which they are suspended. Their length should be so adjusted that by elevating the handle the front legs of the pallet will come in contact with the treadles about one inch from the ends of the treadles, and so of the rear legs, by depressing the handle. About two or three inches forward of the pivots a small pin, called an adjusting pin, three fourths of inch in diameter is inserted horizontally in one or both the shafts to facilitate the operation of setting the rake when it has revolved. The ends of these pins should project over the lower ends of the levers, and their position should be such that they will present no obstruction to the rakes revolving, and the rakeman by depressing the handle should be able by their means to raise the shaft legs one third of an inch above the rake teeth on which they rest.

The reader by attentively considering this form of construction will perceive that by elevating the handle until the front legs of the pallets are in contact with the treadles will throw the rear legs back so as to clear the treadles continue to elevate the handle when the rake is going will cause the rake head to revolve, and those teeth which before were in the rear will change to the front, and those on which the shaft legs are to rest will bend those legs laterally until they have passed them, when the legs by their elasticity will regain their place. In order to accomplish the entire operation however it is necessary to depress the handle when the rake head is nearly over which will elevate the shafts and bring the shaft and legs to their place.

What I claim as my own invention and desire to secure by Letters Patent is—

1. The use of pallets and treadles to regulate the revolving motion of the rake head, and the use of elastic shaft legs to regulate the pitch of the rate teeth, and keep the shafts and standards in their place with a view to enable the pallets to operate to advantage.

2. I claim also the adjusting pins, and the mode of attaching the levers to the machine, viz, by means of the pivots on which they turn passing horizontally through the levers into the shafts.

HIRAM HUNT.

Witnesses:
   LEVI CARPENTER,
   SAMUEL STORRS.